United States Patent

Chan et al.

[11] Patent Number: 5,707,014
[45] Date of Patent: Jan. 13, 1998

[54] WATER CLEANING APPARATUS

[75] Inventors: Ying-Chiu Chan, Vancouver; Daniel Lo, Burnaby; Kenneth Hung Kwan Ma, Coquitlam, all of Canada

[73] Assignee: Continental Innovation & Technology Inc., Richmond, Canada

[21] Appl. No.: 415,654

[22] Filed: Apr. 3, 1995

[51] Int. Cl.$^6$ .................................................. B05B 3/00
[52] U.S. Cl. ........................... 239/754; 239/588; 239/722
[58] Field of Search ............................. 239/566, 568, 239/588, 754, 722; 134/123

[56] References Cited

U.S. PATENT DOCUMENTS

| | | | |
|---|---|---|---|
| D. 241,545 | 9/1976 | Smith | D23/35 |
| D. 243,610 | 3/1977 | Craig | D23/35 |
| D. 244,532 | 5/1977 | Poston | D23/35 |
| D. 250,826 | 1/1979 | Newman | D23/35 |
| D. 321,574 | 11/1991 | Shevers, Jr. et al. | D32/15 |
| 2,595,933 | 5/1952 | Gilbertsen | 299/56 |
| 2,692,163 | 10/1954 | Geel | 299/47 |
| 2,784,030 | 3/1957 | Dietzel | 299/47 |
| 3,064,904 | 11/1962 | Roberts | 239/754 |
| 3,202,362 | 8/1965 | Wright | 239/287 |
| 3,423,027 | 1/1969 | Small et al. | 239/287 |
| 3,508,709 | 4/1970 | Small et al. | 239/287 |
| 3,654,656 | 4/1972 | Romagosa | 15/24 |
| 3,748,678 | 7/1973 | Ballou | 15/24 |
| 3,931,931 | 1/1976 | Otis | 239/287 |
| 4,002,382 | 1/1977 | Engdahl, Jr. | 239/287 |
| 4,083,495 | 4/1978 | Sharp | 239/287 |
| 4,095,746 | 6/1978 | Anderberg et al. | 239/287 |
| 4,200,236 | 4/1980 | Briar | 239/532 |
| 4,461,052 | 7/1984 | Mostul | 15/29 |
| 4,580,726 | 4/1986 | Unger | 239/286 |
| 4,597,127 | 7/1986 | Swanson | 15/24 |
| 4,903,706 | 2/1990 | Merlin | 239/754 |
| 4,984,746 | 1/1991 | Joyal | 239/722 |

FOREIGN PATENT DOCUMENTS

| | | | |
|---|---|---|---|
| 645790 | 6/1937 | Germany | 239/722 |
| 3101149A1 | 8/1982 | Germany | |
| 1377380 | 12/1974 | United Kingdom | 239/722 |

*Primary Examiner*—Andres Kashnikow
*Assistant Examiner*—Steven J. Ganey
*Attorney, Agent, or Firm*—John R. Uren

[57] ABSTRACT

A water jet cleaner for the underside of a vehicle. A plurality of jets are directed upwardly from a spray head which is mounted on a longitudinal member positioned closely to the ground on which the vehicle is resting. A handle is attached to the longitudinal member and wheels are mounted to the frame and the longitudinal member to allow manual reciprocal movement of the cleaner beneath the vehicle by an operator. The jets are angularly adjustable such that the cleaner may also be used to clean the surface itself such as a driveway.

4 Claims, 9 Drawing Sheets

FIG. IA

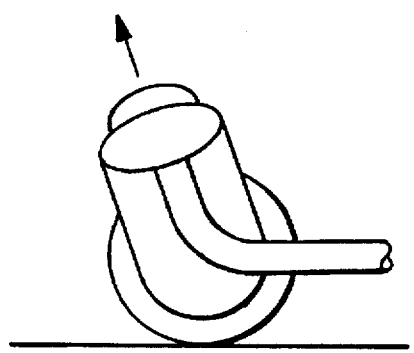
FIG. IB
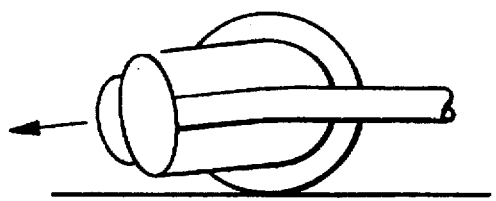
FIG. IC
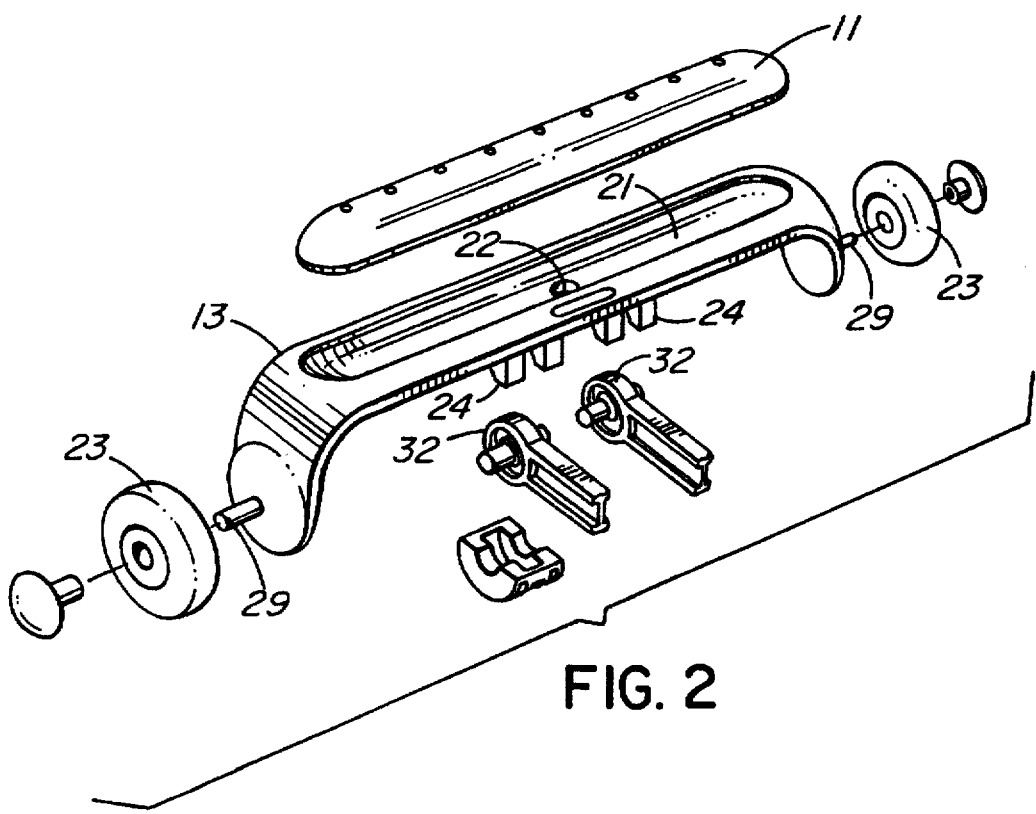
FIG. 2

WATER CLEANING APPARATUS

INTRODUCTION

This invention relates to a water broom and, more particularly, to a water broom which is utilised for cleaning the underbody or chassis of automobiles.

BACKGROUND OF THE INVENTION

There are many devices which utilise water to clean or rinse an object. Such devices include the well known water wand which exudes water under relatively higher pressure to spray dirt, salt, etc. on an automobile. The use of the water wand is useful for the removal of dirt and road debris which will not ordinarily be removed by the pressure of a garden hose.

It is often the case that roads in cold winter climates are subject to the use of salt to melt ice and snow under certain conditions. The roadway salt is transferred to the chassis of a vehicle under operation in such condition. The corrosive effects of salt are well known and it is therefore efficacious to remove the salt as soon as possible after a vehicle has been so exposed.

Previously, the removal of salt from the underside of vehicles posed difficulties. It is awkward to thoroughly clean the underside of a vehicle with a garden hose. This is because the hose is applied from the side of the vehicle thereby making the visibility of the salt in all positions with respect to the hose impossible. While a water wand may be sprayed upwardly from the side of the vehicle in an attempt to reach all of the salt, it too is difficult to use since the operator cannot see where the water reaches under operation.

Water sweepers which clean an area beneath the jets of the sweeper are known. Typical examples are illustrated and described in U.S. Pat. No. 4,095,746 (Anderberg et al), U.S. Pat. No. 4,022,382 (Engdahl, Jr.) and U.S. Pat. No. 2,784,030 (Dietzel). These sweepers are designed to clear an area beneath the jets such as a driveway or sidewalk or a concrete surface.

Likewise, washers for cleaning the underside of a vehicle are also known. Such apparatuses include those shown in U.S. Design 321,574 (Shevers, Jr. et al), U.S. Pat. No. 4,580,726 (Unger) and U.S. Pat. No. 4,984,746 (Joyal). These devices, however, comprise castoring or steerable wheels to move the broom which is unnecessarily costly and adds unnecessary weight to the apparatus.

SUMMARY OF THE INVENTION

According to the invention, there is provided a water broom having a spray head operable to emit fluid in a generally upwardly direction from a plurality of jets mounted in a frame, said frame being mounted on wheels, a longitudinal member operably connected to said frame, said member extending generally normal to said frame, a handle mounted to said longitudinal member and extending generally upwardly for a distance ending approximately at the position of the hands of an operator, said plurality of jets having an angular orientation which is adjustable so as to allow said jets to emit water in an upwardly or downwardly direction, and the axis of said wheels on said wheel mounted frame being in a fixed configuration relative to said frame.

DESCRIPTION OF THE SEVERAL VIEWS OF THE DRAWINGS

Specific embodiments of the invention will now be described, by way of example only, with the use of drawings in which:

FIG. 2 is an exploded isometric view of the frame particularly illustrating the plurality of water jets and one connection between the longitudinal member and the frame;

DESCRIPTION OF SPECIFIC EMBODIMENT

Figure 1:
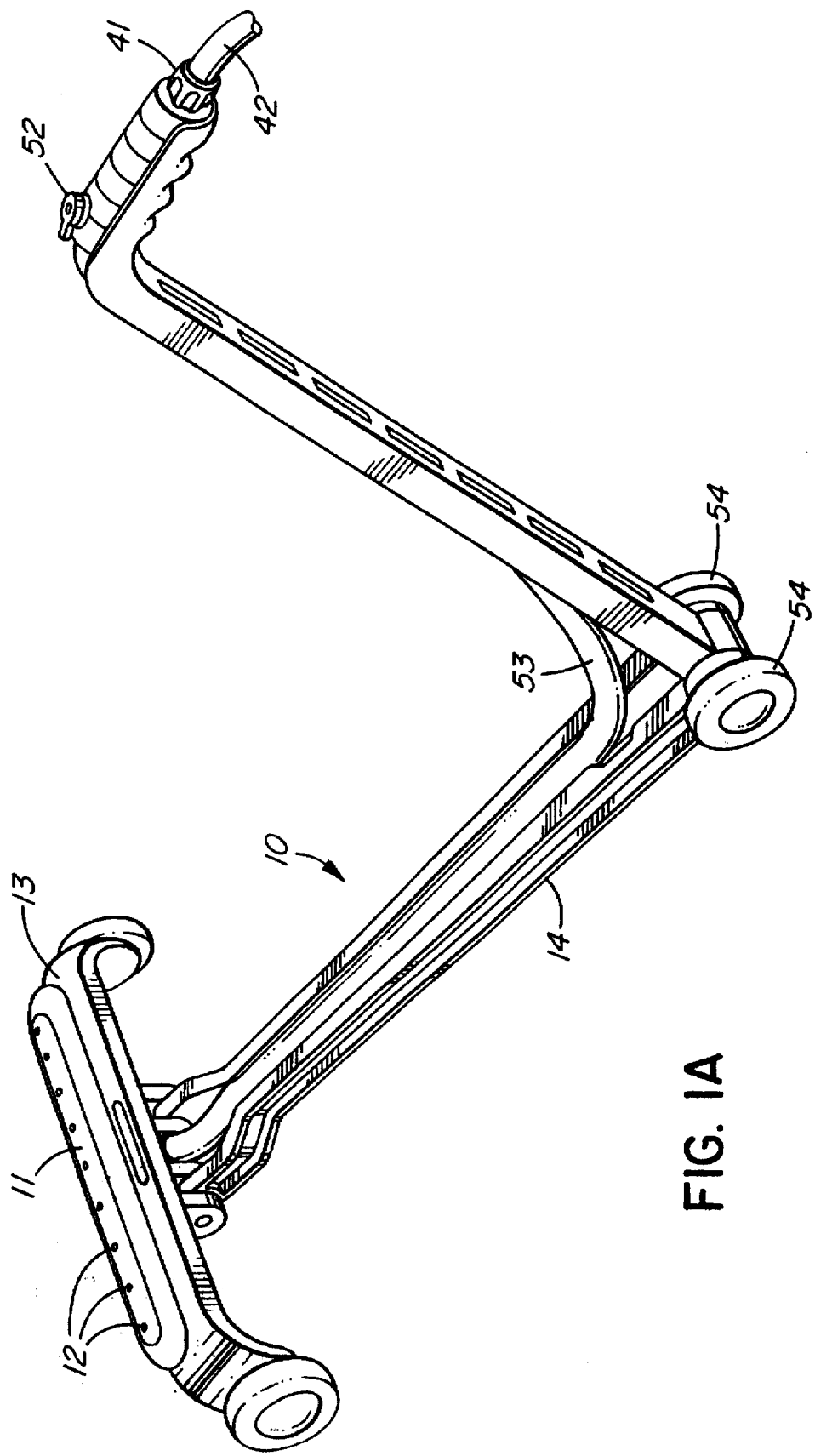
FIG. 1A is a diagrammatic isometric view of the water broom according to the present invention.
FIGS. 1B and 1C are diagrammatic side views of the broom and illustrate the angle adjustment of the frame.

Referring now to the drawings, a cleaner referred to as a WATER BROOM (Trademark) which is used to clean the underside of a vehicle is generally illustrated at 10 in FIG. 1A. It comprises a spray head 11 which includes a plurality of upwardly directed water jets 12, a frame 13 on which the spray head 11 is mounted, a longitudinal member 14 which is rotatably connected to the frame 13 and a handle 20 which extends upwardly and at an obtuse angle from the longitudinal member 14.

The spray head 11 and the frame 13 are shown in more detail in FIG. 2. Spray head 11 is mounted to the frame 13 over a cavity 21. Water enters the cavity 21 through a water inlet 22 as will be described in greater detail. A pair of wheels 23 are rotatably mounted via shafts 29 on frame 13 and are operable to hold the wheels 23 in a non-steerable stationary position with respect to the cleaner 10.

Figure 3A:
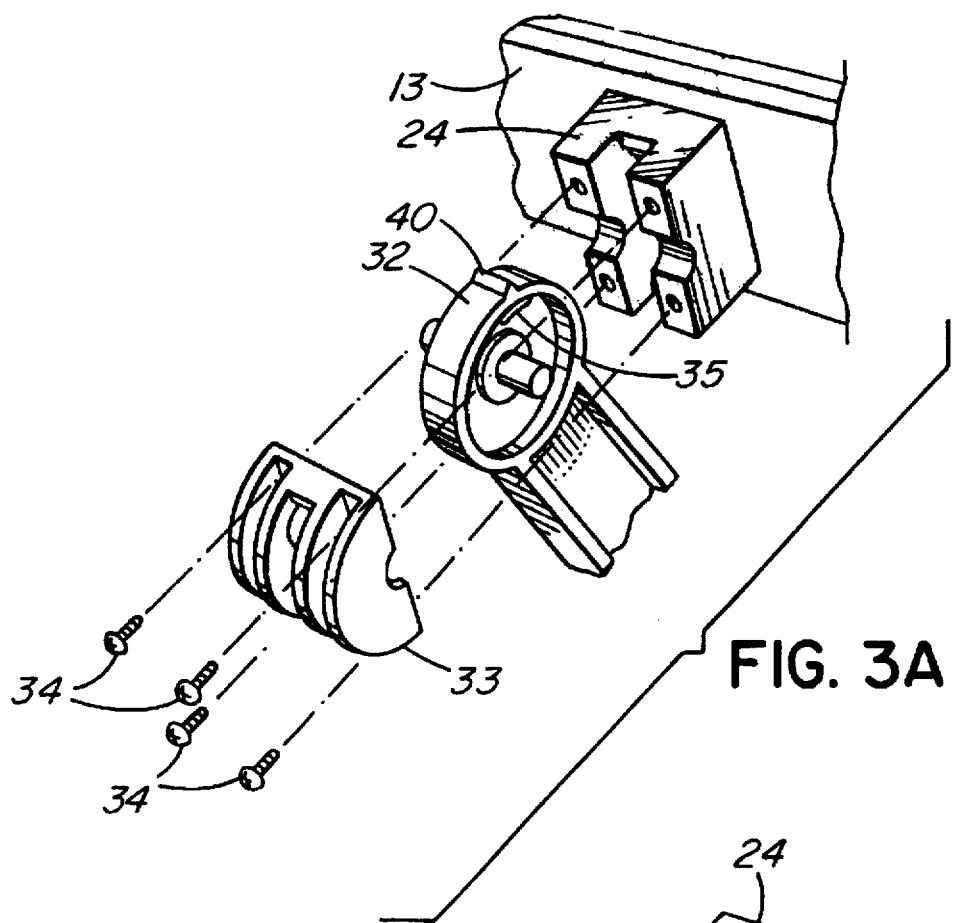
FIG. 3A is an exploded isometric view in greater detail illustrating the connection between the frame and the longitudinal member.
Figure 3B:
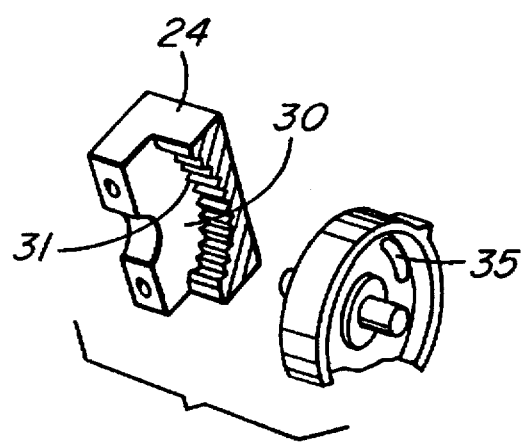
FIG. 3B is an exploded isometric view illustrating in greater detail the connection between the frame and the longitudinal member and, in particular, illustrating the racheting rotation member.
Figure 3C:
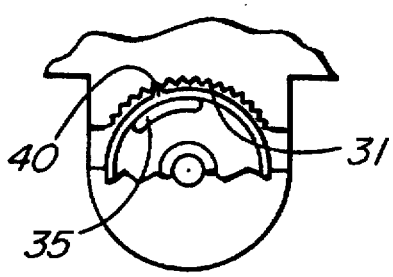
FIG. 3C is a view similar to FIG. 3B but illustrating the racheting rotational member in its assembled position within the race.

Referring now to FIG. 3A, 3B and 3C, two brackets 24 are mounted on or molded with the bottom of the frame 13 (only one of which is shown). The interior 30 of each bracket 24 (FIG. 3B) is arc shaped with a plurality of ratchet type serrations 31 extending over the arc shaped surface 30. The interior surface 30 is adapted to complement the radius of curvature of the circular end 32 of the longitudinal member 14 which allows the frame 13 to rotate relative to the longitudinal member 14. A cap 33 retains circular end 32 within it and the bracket 24. The cap 33 is connected to the bracket 24 with screws 34.

Each of the circular ends 32 has a single ridge 40 mounted on the outer periphery of the circular end 32. The ridge 40 is complementary to serrations 31 and fits between two (2) respective serrations (FIG. 3C) on the interior 30 of the bracket 24. Each of the circular ends 32 also includes an arc shaped hole 35. Hole 35 is designed so as to allow sufficient flexibility of the ridge 40 with respect to the circular end 32 that a resilient action maintains the ridge 40 between the serrations 31 so as to discourage relative movement therebetween while still allowing for movement of the 10 ridge 40 relative to the serrations 31 when it is desired to alter the angle of frame 13 and, consequently, the angle of the water jets 12.

The cleaner 10 according to the invention is intended to be of low cost and for primarily domestic as opposed to industrial use. To that end, a fitting 41 (FIG. 1A) is provided in the handle 20 for attachment to a garden hose 42. A second hose 53 extends from the handle 20 to the water inlet 22 (FIG. 2) within the longitudinal member 14.

Figure 7:
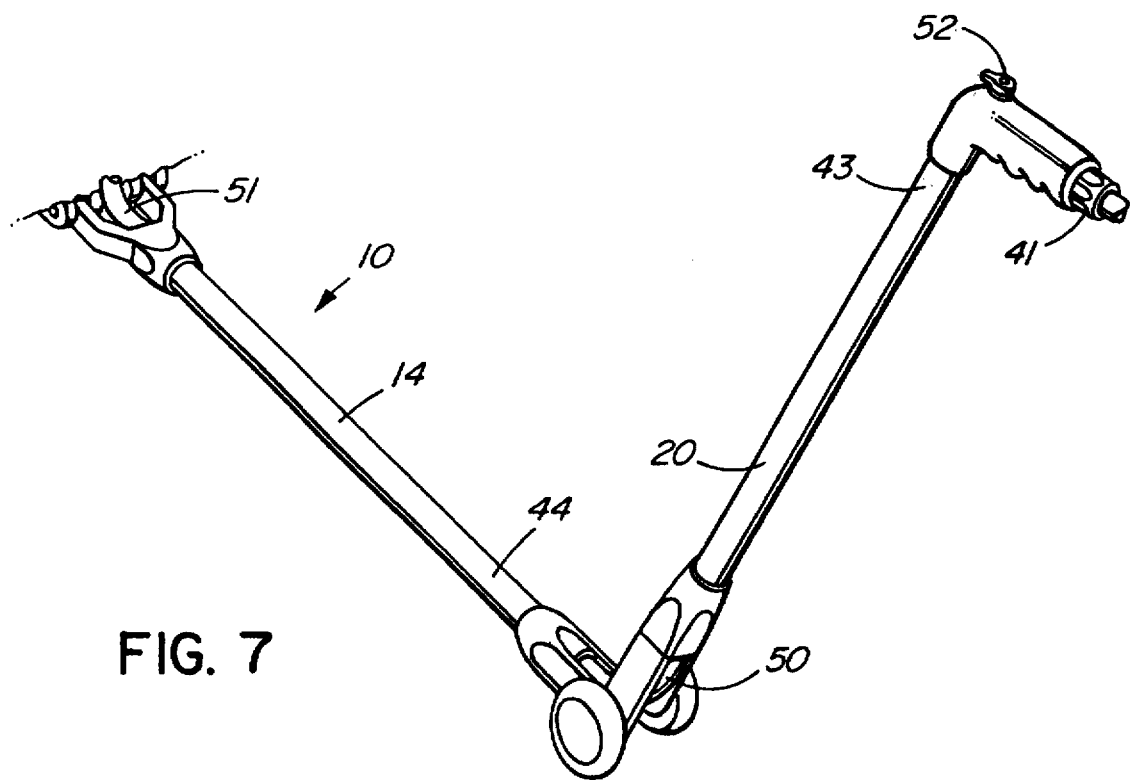
FIG. 7 is a diagrammatic isometric view of the apparatus according to the invention in a further embodiment.

In a further embodiment of the invention, pipes 43, 44 (FIG. 7) are provided, one for handle 20 and one for longitudinal member 14, respectively. The pipes 43, 44 are conveniently made from a plastic, preferably PVC or ABS plastic. Two flexible hose pieces 50, 51 are also provided. Hose piece 50 extends between the handle 20 and longitudinal member 14. Hose piece 51 extends between the longitudinal member 14 and the water inlet 22 on frame 13. An on-off switch 52 is provided to turn the water received from the garden hose 42 on or off.

A pair of wheels 54 are mounted between the handle 20 and the longitudinal member 14 to assist movement of the cleaner 10.

OPERATION

In operation, it will be assumed that the cleaner 10 is in the configuration illustrated in FIG. 1A; that is, the garden hose 42 has been connected to the fitting 41 and the frame 13 and attached spray head 11 are in the position shown in FIG. 1A and 1B such that the water jets 12 are directly upwardly.

Figure 4A:
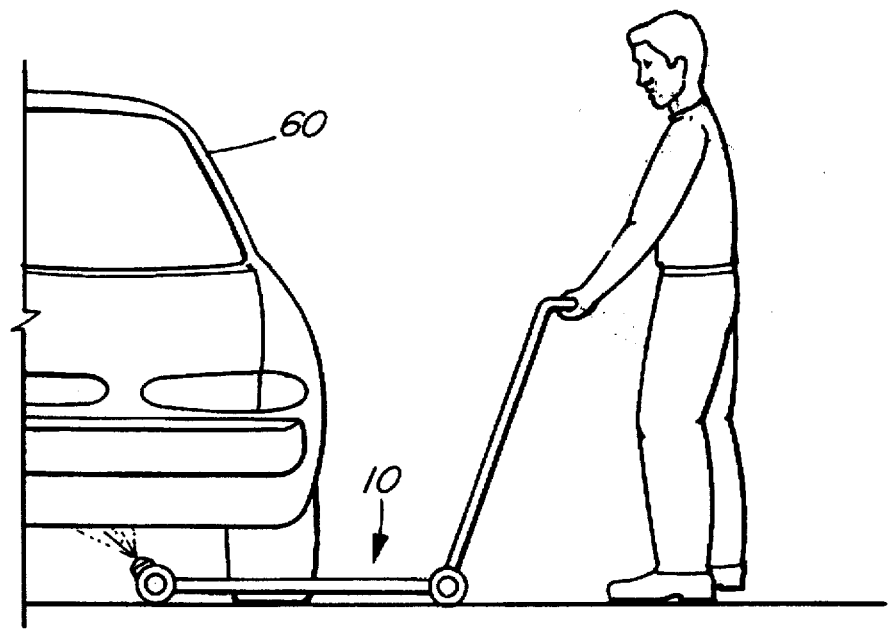
FIGS. 4A and 4B are diagrammatic views of the apparatus according to the invention being used as a cleaning member for the underside of vehicles and for a surface, respectively.

The operator will turn the switch 52 on and water will flow through the hose 53 to the water inlet 22 and, thence, to the cavity 21. The water jets 12 are adapted to release a jet of pressurized water. The water will be so released from the jets 12 when the cavity 21 is filled. With reference to FIG. 4A, the operator will push the cleaner 10 under the vehicle 60 and the water from the jets will shoot upwardly thereby to remove road debris, salt and the like from the underside of the vehicle 60.

Figure 4B:
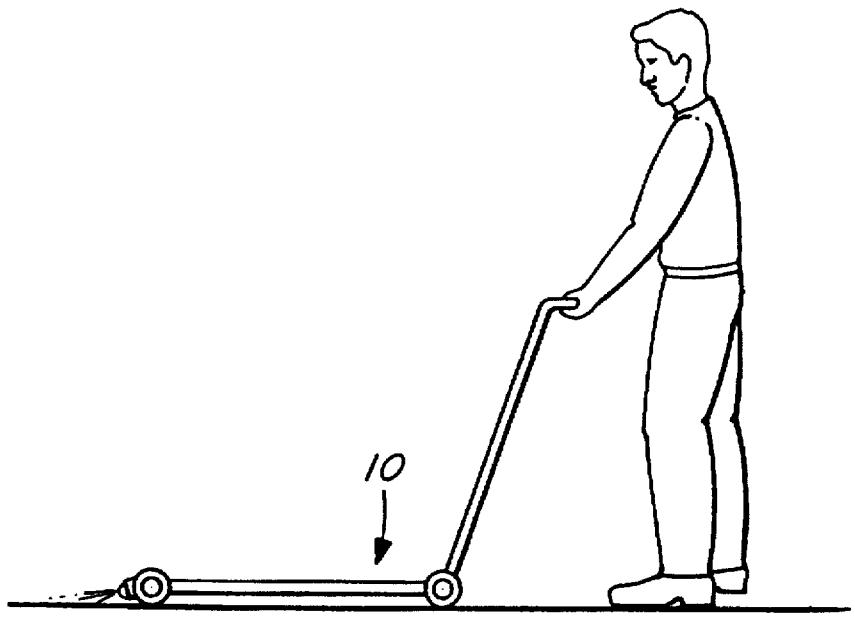

In the event the operator wishes to clean a driveway or other surface, he will merely manually rotate the frame 13 relative to the longitudinal member 14 until the frame 13 and spray head 11 take the position illustrated in FIG. 1C. In such operation, the ridge 40 will remain stationary and the serrations 31 on the bracket 24 will move counterclockwise as viewed in FIG. 3C until the position illustrated in FIG. 1C is reached. Once again, the operator will simply move the cleaner 10 backwards and forwards over the surface to be cleaned as illustrated in FIG. 4B.

Figure 5A:
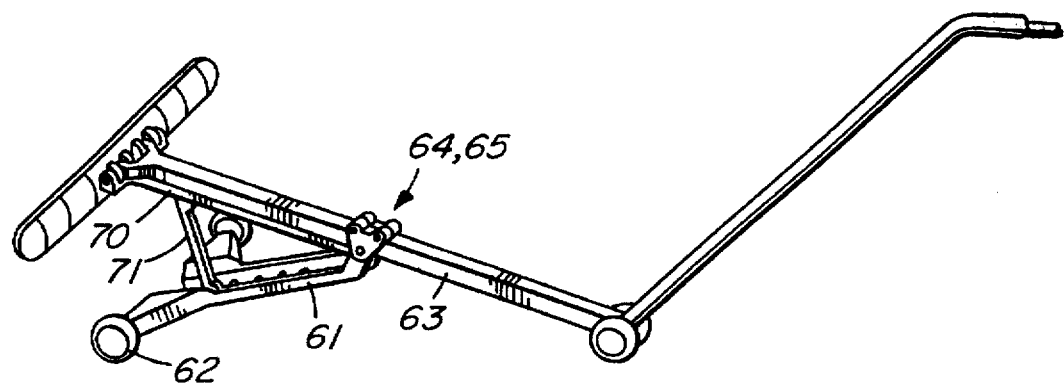
FIGS. 5A and 5B illustrate a further embodiment of the apparatus according to the invention with a height adjustment for the jets
Figure 5B:
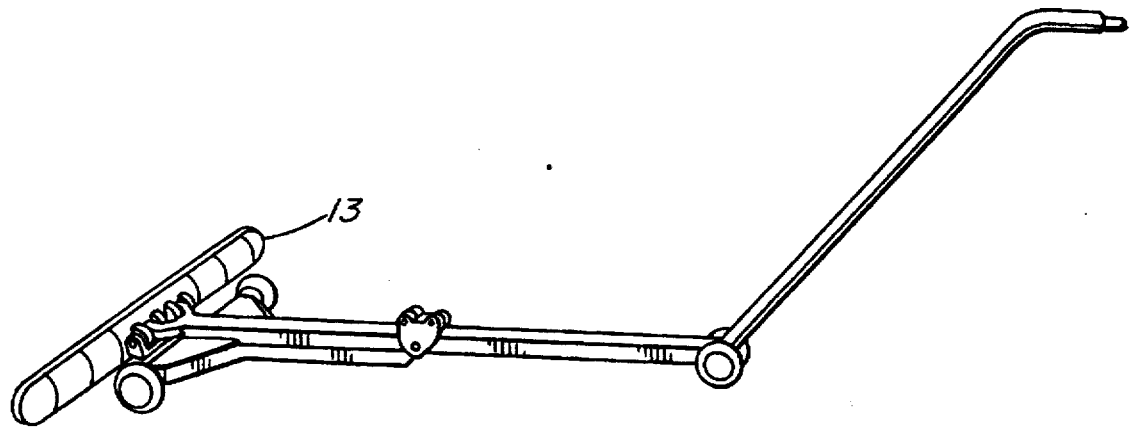
Figure 5C:
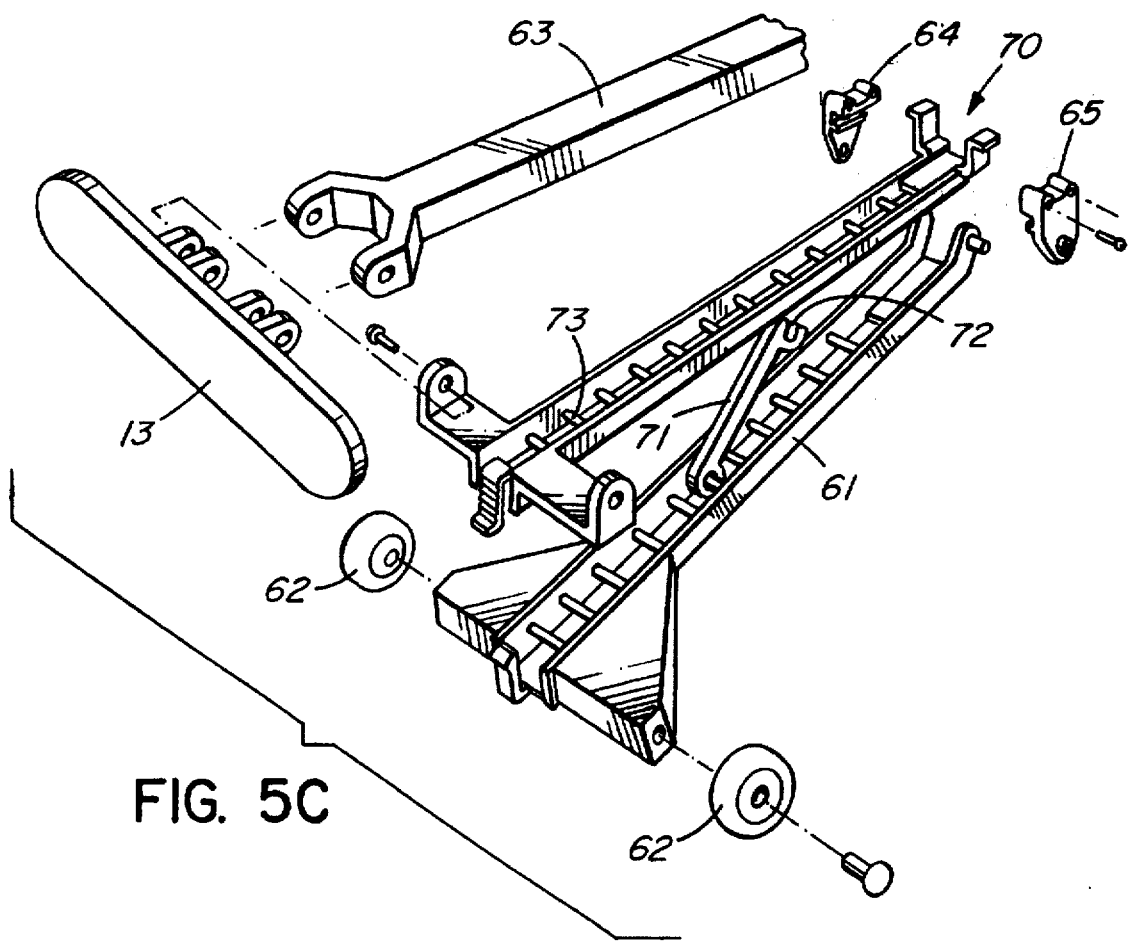
FIG. 5C is an exploded view illustrating the height adjustment connection in greater detail
Figure 5D:
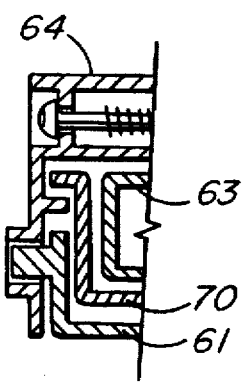
FIG. 5D is a diagrammatic cross-sectional view of the bracket connection in a further embodiment of the invention.

A further embodiment of the invention is illustrated in FIGS. 5A, 5B and 5C in the event the height of the frame 13 and spray head 11 are desired to be height adjustable so as to bring the jets 12 into closer proximity to the underside of the vehicle 60. In this instance, the frame 13 is mounted to the longitudinal member 63 as previously described. However, the wheels 62 are not mounted to the frame 13 but, rather, are mounted to a movable T-shaped lower arm 61 which is connected to longitudinal member 63 by using brackets 64, 65 (FIG. 5C) mounted about longitudinal member 63. A second member 70 is also provided which is designed to be connected to brackets 64, 65 at one end and to frame 13 at the opposite. Second member 70 extends below and within longitudinal member 63. Wheels 62 are mounted to lower arm 61.

Figure 6A:
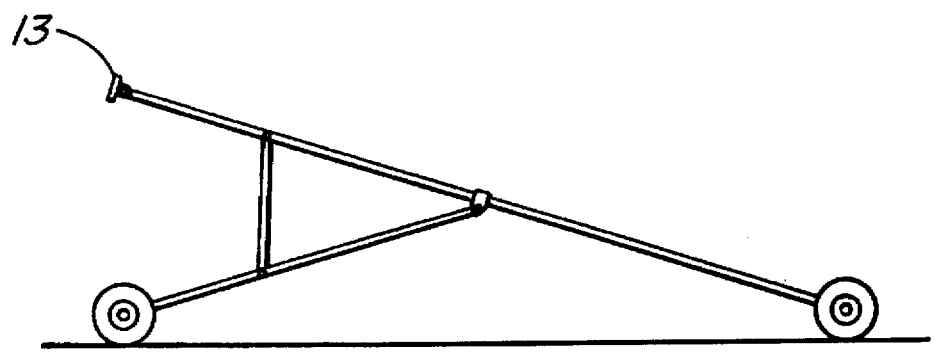
FIGS. 6A–6C illustrate the apparatus according to the invention with the height adjustment in the high, medium and low positions.
Figure 6B:
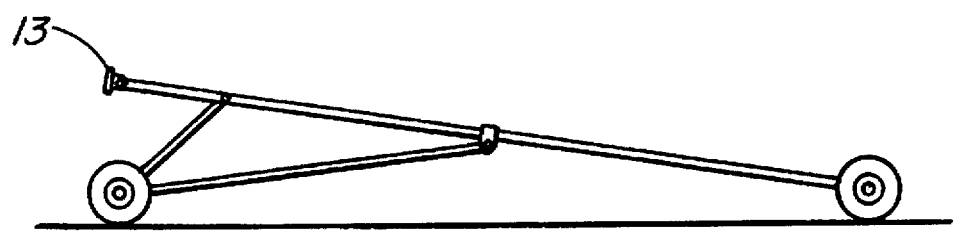
Figure 6C:
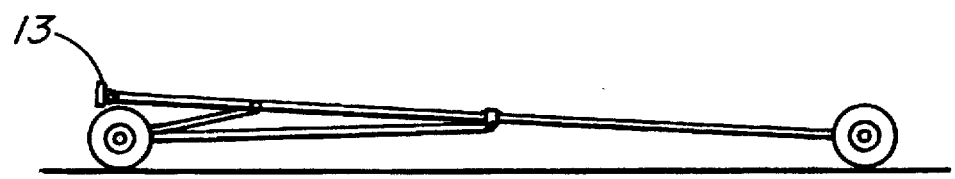

An adjustment lever 71 is provided which extends between second member 70 and lower arm 61. The adjustment lever 71 has openings 72 at each end which are adapted to fit over a series of complementary ribs 73 in second member 70 and lower arm 61. Thus, by moving the adjustment lever 71, the height of the frame 13 may take high, medium or low positions as seen in FIGS. 6A, 6B and 6C, respectively.

Figure 8A:
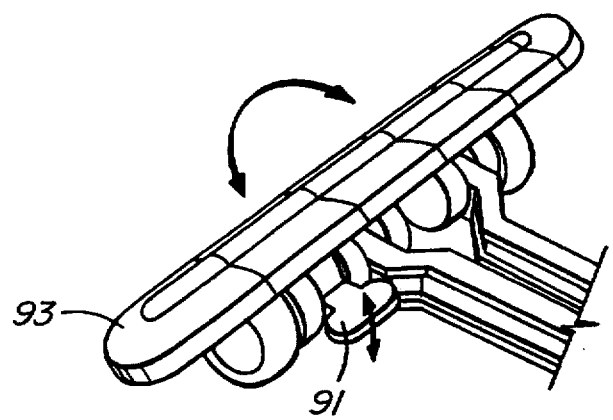
FIG. 8A is a diagrammatic isometric view of the connection between the frame and the spray head of the water broom according to a further embodiment of the invention.
Figure 8B:
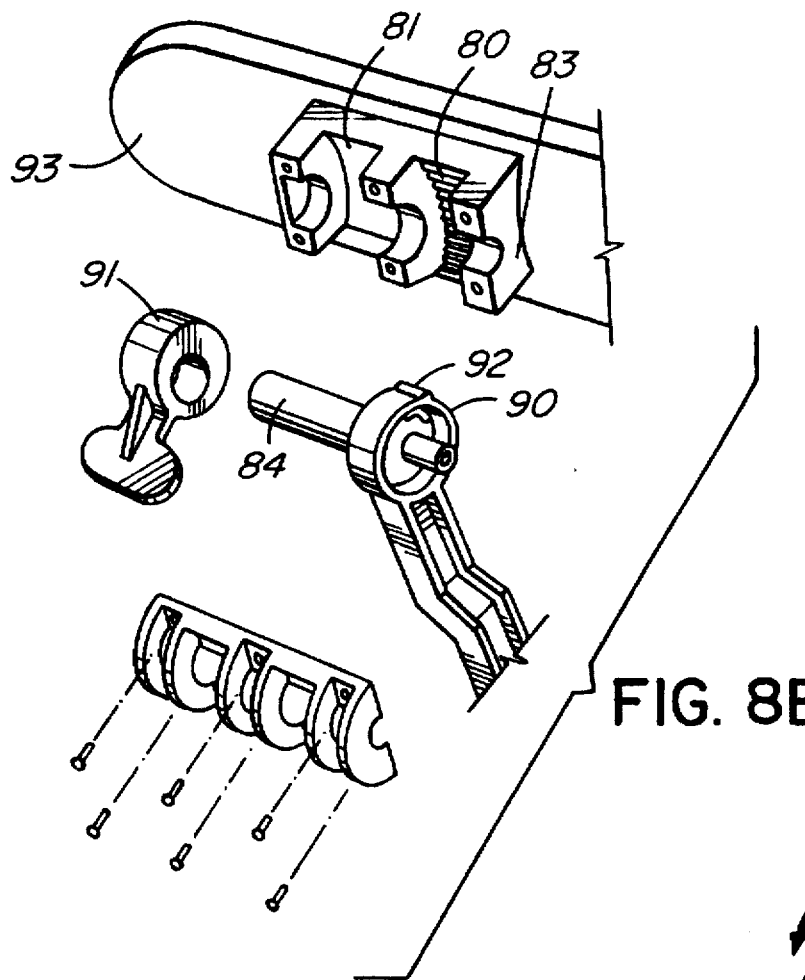
FIG. 8B is an exploded and enlarged partial view of the connection of FIG. 8A.
Figure 8C:
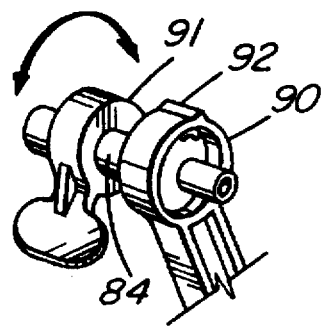
FIG. 8C is a diagrammatic view illustrating the action of the cam of the connection of FIGS. 8A and 8B.
Figure 8D:
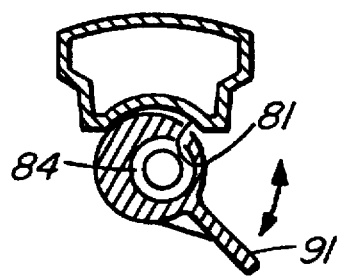
FIG. 8D is a diagrammatic view of the cam particularly illustrating its eccentric mounting.

A further embodiment of the inventin is illustrated in FIGS. 8A–8D. In this embodiment, two races 80, 81 are provided in bracket 83. Race 80 contains serrations as in the embodiment illustrated in FIGS. 3A–3C. However, race 81 is intended to be a circular surface which contacts a cam 91. A pin 84 extends from circular end 90 and cam 91 is mounted on the pin 84 so as to be rotatable. Thus, frame 93 may be rotated to any of an infinite number of angular positions desired and, thereafter, cam 91 is rotated so as to contact the circular surface of race 81 and hold it in the desired position as illustrated in FIG. 8D. This embodiment would be useful if, for example, it is found that the serrations in race 80 on the ridge 92 on circular end 90 become worn and are unable to retain the frame 93 in its desired position.

Many modifications to the cleaner herein described will readily occur to those skilled in the art to which the invention relates and the specific embodiments should be taken as illustrative of the invention only and not as limiting its scope as defined in accordance with the accompanying claims.

What is claimed is:

1. A water broom having a spray head operable to emit fluid in a generally upwardly direction from a plurality of jets mounted in a frame, said frame being mounted on wheels, said wheels each having an axis, a longitudinal member operably connected to said frame, said member extending generally normal to said frame, a handle mounted to said longitudinal member and extending generally upwardly for a distance ending approximately at the position of the hands of an operator, said plurality of jets having an angular orientation which is adjustable so as to allow said jets to emit water in an upwardly or downwardly direction, said axis of said wheels on said wheel mounted frame being in a fixed configuration relative to said frame, said handle including a fitting for attachment to a hose and a switch for opening or closing the sul of water from said hose, said frame being rotatably adjustable relative to said longitudinal member between at least two positions, the first of said two positions being directed generally upwardly and the second of said two positions being directed generally forwardly and downwardly.

2. A water broom as in claim 4 and further comprising a bracket between said frame and a circular end of said longitudinal member, one of said bracket or said circular end of said longitudinal member having serrations and the other of said bracket or said circular end of said longitudinal member having a ridge complementary to and movable within said serrations.

3. A water broom as in claim 1 and further comprising a cam member rotatable within a race, said cam member maintaining said frame at a predetermined angle when said cam is in firm contact with said race.

4. A water broom as in claim 3 wherein said predetermined angle of said frame is adjustable between said first and second positions.

* * * * *